(No Model.)
J. BLAIS.
VEHICLE WHEEL.
No. 380,852. Patented Apr. 10, 1888.
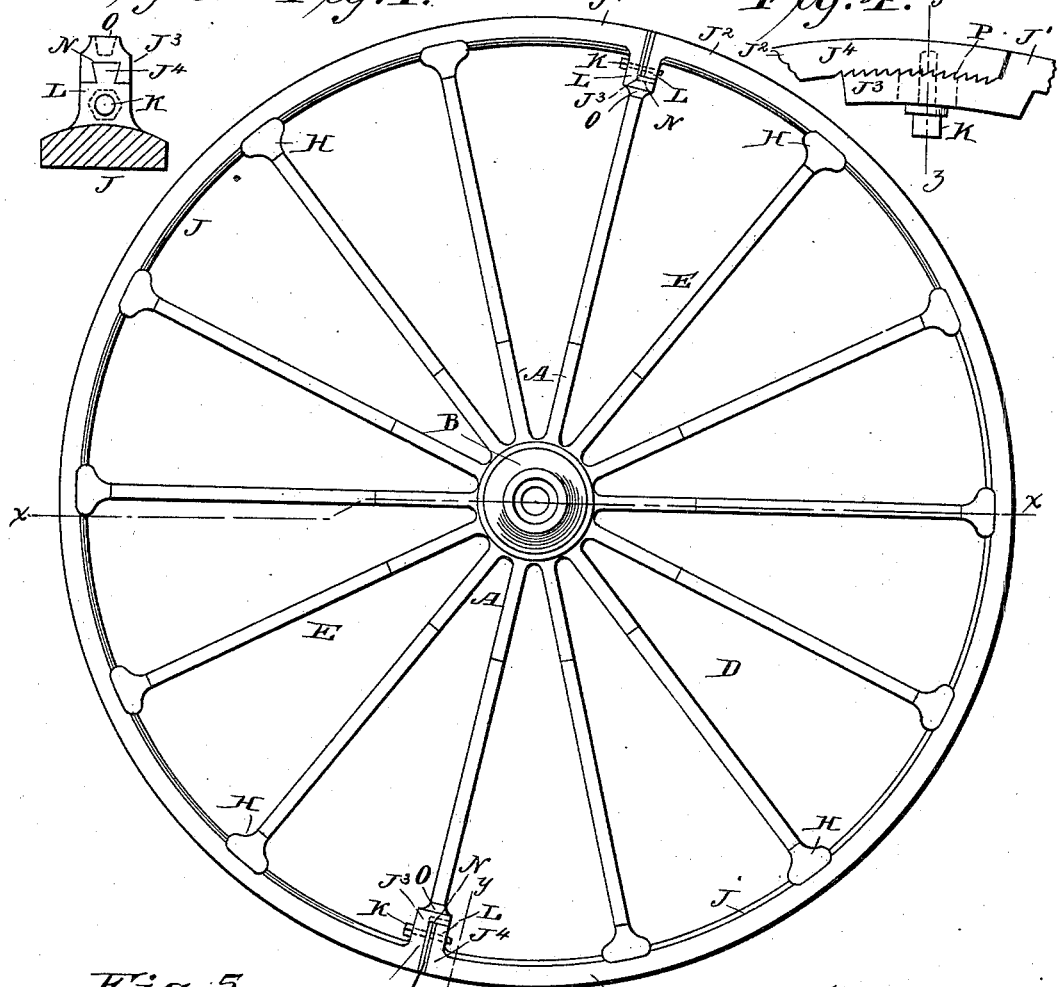
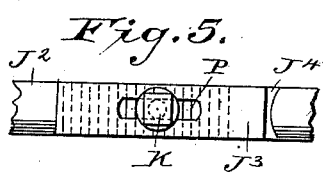
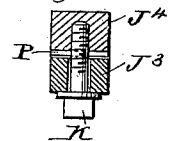
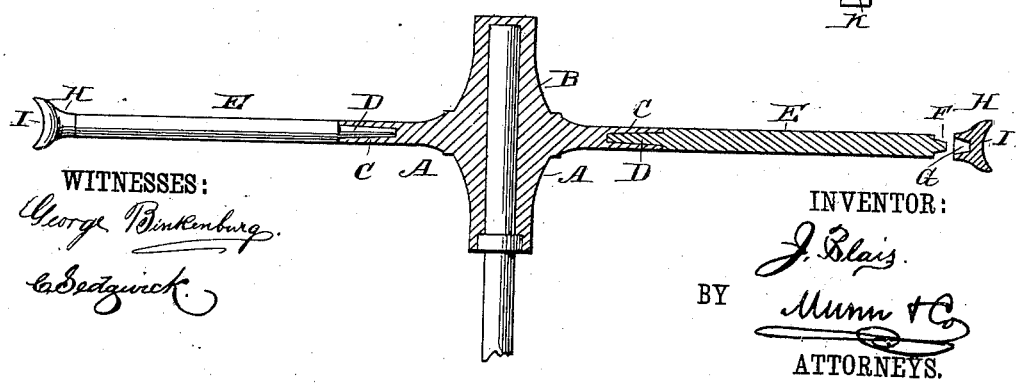
WITNESSES:
George Binkenburg.
C. Sedgwick.
INVENTOR:
J. Blais.
BY Munn & Co.
ATTORNEYS.
N. PETERS, Photo-Lithographer, Washington, D. C.

UNITED STATES PATENT OFFICE.

JOSEPH BLAIS, OF DULUTH, MINNESOTA.

VEHICLE-WHEEL.

SPECIFICATION forming part of Letters Patent No. 380,852, dated April 10, 1888.

Application filed August 11, 1887. Serial No. 246,680. (No model.)

*To all whom it may concern:*

Be it known that I, JOSEPH BLAIS, of Duluth, in the county of St. Louis and State of Minnesota, have invented a certain new and useful Improvement in Vehicle-Wheels, of which the following is a specification.

The object of my improvement is to provide a wheel for vehicles, whereby greater strength and elasticity with a more convenient and effective adjustability for shrinkage are obtainable than usual.

I will first describe in detail a vehicle-wheel embodying my improvement, and then point out the various features of the improvement in claims.

Reference is to be had to the accompanying drawings, forming a part of this specification, in which similar letters of reference indicate corresponding parts in all the figures.

Figure 1 is an elevation of a vehicle-wheel embodying my improvement. Fig. 2 is a transverse sectional view of the said wheel on the line $x\, x$, Fig. 1, the rim being removed. Fig. 3 is a cross-sectional view of the rim on the line $y\, y$, Fig. 1. Fig. 4 is a side view of a modified form of take-up rim-joint. Fig. 5 is a view of the inner side of the said joint; and Fig. 6 is a cross section of the same on the line $z\, z$, Fig. 4.

The radial arms A, which are cast integrally with a metallic hub, B, to form the inner sections of the spokes, in a well-known manner, have smooth sockets C, preferably of elliptical cross-section, formed in their outer ends to receive corresponding tenons, D, on the inner ends of the main spoke-sections E.

The main spoke-sections E are formed of wood, and have tenons F on their outer ends for reception in corresponding sockets, G, formed in ordinary metallic caps, H.

The caps H have outer sockets, I, fitted to receive the inner convex face of the rim J, and thereby hold the same from lateral displacement, while allowing it to be adjusted circularly for shrinkage, &c.

The rim J is made of a single thickness of metal, as iron and steel, thereby forming a combined felly and tire of great strength.

The described construction of wheel puts solid metal where the greatest strains and wear are encountered—namely, at and around the hub and the rim of the wheel, while the vibrations transmitted from the solid metallic rim to the solid metallic hub are deadened by the interposition of the wooden spoke-sections.

For taking up shrinkage in the wheel the solid metallic rim J is made in several segmental sections, of which two, J' and J², are here shown, one section, J', having inward offset ends J³, and the corresponding ends, J⁴, of the other section, J², being lapped over said offset ends, so as to make the outer bearing-faces of the two sections coincide.

A binding-screw, K, connecting the ends of the two sections at each joint serves to firmly unite the same when properly adjusted upon each other.

In Figs. 1 and 3 the meeting ends are shown formed with ears L, between which a compressible filling, M, which may be of rubber, leather, or other suitable material, is held, and through which the binding-screw K is passed, so that by turning said screw the two ears, and hence the two rim-sections, can be drawn tightly together, so as to firmly unite the whole. The overlapping ends of the rim-sections are also there shown connected by a dovetail slide-joint, N, so as to permit them to play lengthwise upon each other, but hold them from lateral separation. At the said joints the caps H are omitted, and the offset ends J³ of the rim-section J' formed on their inner sides with socketed bosses O, to receive the outer end tenons F on the main spoke-sections C.

In Figs. 4, 5, and 6 the overlapping ends are shown formed on their faces, in contact with each other, with teeth P, and having the binding-screw K passed through a slot in one of said ends into the other from the inside, so that on drawing the overlapping ends over each other until the required adjustment is attained, and then binding them together by means of the screw K, the teeth P, interlocking, will firmly unite the two sections.

Having thus fully described my invention, I claim as new and desire to secure by Letters Patent—

1. In a vehicle-wheel, the combination of a hub, spokes, caps fixed on the outer ends of the spokes having outer sockets, a split metallic rim fitted to run circularly in said sockets, but incapable of shifting laterally therein, one of the split ends of said rim being fastened immovably to the corresponding cap and the other end adjustable thereon, and a rim take-up, substantially as described.

2. In a take-up for a sectional metallic wheel-rim, the jointing ends connected by a dovetail slide-joint, and both formed with ears, in combination with a binding-screw for drawing the ears together, substantially as described.

3. In a sectional metallic rim for vehicle-wheels, a jointing end, $J^3$, of one rim-section having a socket for reception of a spoke-tenon, substantially as described.

JOSEPH BLAIS.

Witnesses:
L. M. GEMATH,
NAPOLEON CAMPBELL.